US011569560B2

(12) United States Patent
Gothef et al.

(10) Patent No.: US 11,569,560 B2
(45) Date of Patent: Jan. 31, 2023

(54) VEHICLE/VESSEL/AIRPLANE WITH A ROTATABLE ANTENNA

(71) Applicant: THRANE & THRANE A/S, Kgs. Lyngby (DK)

(72) Inventors: Ulrich Vesterager Gothelf, Maaloev (DK); Claus Schakow, Taastrup (DK)

(73) Assignee: THRANE & THRANE A/S, Kgs. Lyngby (DK)

( * ) Notice: Subject to any disclaimer, the term of this patent is extended or adjusted under 35 U.S.C. 154(b) by 693 days.

(21) Appl. No.: 15/738,800

(22) PCT Filed: Jun. 23, 2015

(86) PCT No.: PCT/EP2015/064100
§ 371 (c)(1),
(2) Date: Dec. 21, 2017

(87) PCT Pub. No.: WO2016/206726
PCT Pub. Date: Dec. 29, 2016

(65) Prior Publication Data
US 2018/0175477 A1 Jun. 21, 2018

(51) Int. Cl.
*G01S 19/11* (2010.01)
*G01S 5/02* (2010.01)
(Continued)

(52) U.S. Cl.
CPC ............... *H01Q 1/125* (2013.01); *H01Q 1/18* (2013.01); *H01Q 1/28* (2013.01); *H01Q 1/32* (2013.01);
(Continued)

(58) Field of Classification Search
CPC combination set(s) only.
See application file for complete search history.

(56) References Cited

U.S. PATENT DOCUMENTS 3,999,184 A 12/1976 Fuss, III
4,035,805 A 7/1977 Mobley
(Continued)

FOREIGN PATENT DOCUMENTS

CN 101068102 A 11/2007
CN 101777695 A 7/2010
(Continued)

OTHER PUBLICATIONS

International Search Report PCT/ISA/210 for International Application No. PCT/EP2015/064100 dated Feb. 12, 2016.
(Continued)

*Primary Examiner* — Muhammad S Islam
*Assistant Examiner* — Charles S Laughlin
(74) *Attorney, Agent, or Firm* — Harness, Dickey & Pierce, P.L.C.

(57) ABSTRACT

A vehicle, vessel or airplane having an antenna and a motor rotating the antenna, a rotation encoder outputting information relating to the rotation and outputting the information to two controllers of which one controls the motor. The other controller receives the rotation information and information relating to a position/direction/axis in relation to the vehicle/vessel/airplane and outputting a second signal based thereon. The output of the second controller may be used for controlling the motor to have the antenna directed toward e.g. a satellite irrespective of the motion of the vehicle/airplane/vessel.

15 Claims, 2 Drawing Sheets

(51) Int. Cl.

| | |
|---|---|
| ***H01Q 1/12*** | (2006.01) |
| ***H01Q 1/18*** | (2006.01) |
| ***H01Q 1/28*** | (2006.01) |
| ***H01Q 1/32*** | (2006.01) |
| ***H01Q 1/34*** | (2006.01) |
| ***H01Q 3/02*** | (2006.01) |
| ***H01Q 3/04*** | (2006.01) |

(52) U.S. Cl.
CPC ................. *H01Q 1/34* (2013.01); *H01Q 3/02* (2013.01); *H01Q 3/04* (2013.01)

(56) References Cited

U.S. PATENT DOCUMENTS

| | | | | |
|---|---|---|---|---|
| 4,100,472 A | | 7/1978 | Mobley | |
| 4,586,050 A | * | 4/1986 | Kuroda ..................... | G01S 3/44 342/426 |
| 4,873,526 A | * | 10/1989 | Katsuo ..................... | H01Q 3/08 342/359 |
| 5,557,285 A | * | 9/1996 | Bender .................... | H01Q 1/18 342/359 |
| 6,049,306 A | | 4/2000 | Amarillas | |
| 6,586,898 B2 | | 7/2003 | King et al. | |
| 2007/0267996 A1 | * | 11/2007 | Shibasaki ................ | B41J 29/38 318/696 |
| 2010/0207834 A1 | | 8/2010 | Wahlberg et al. | |
| 2011/0074602 A1 | | 3/2011 | Cornwall et al. | |

FOREIGN PATENT DOCUMENTS

| | | | |
|---|---|---|---|
| CN | 101881972 | A | 11/2010 |
| CN | 201717865 | U | 1/2011 |
| CN | 202871980 | U | 4/2013 |
| EP | 1852965 | A1 | 11/2007 |
| JP | S52-13753 | A | 2/1977 |
| JP | H07-176933 | A | 7/1995 |
| WO | WO-2009/039998 | A2 | 4/2009 |

OTHER PUBLICATIONS

Written Opinion of the International Searching Authority PCT/ISA/237 for International Application No. PCT/EP2015/064100 dated Feb. 12, 2016.

White Paper: QCI-WP003, QuickSilver Controls, Inc., "Servo Control Of A Microstep Motor", www.quicksilvercontrols.com, Mar. 14, 2008.

English Translation of Office Action dated Aug. 14, 2019, issued in corresponding Chinese Application No. 2015800811447.

European Communication pursuant to Article 94(3) EPC dated Apr. 26, 2021 for corresponding European Application No. 15735648.6.

* cited by examiner

VEHICLE/VESSEL/AIRPLANE WITH A ROTATABLE ANTENNA

CROSS-REFERENCE TO RELATED APPLICATIONS

This is a National Phase of PCT Patent Application No. PCT/EP2015/064100, filed on Jun. 23, 2015, the contents of which is hereby incorporated by reference in its entirety.

The present invention relates to a vehicle/vessel/airplane comprising a radiation emitting/receiving element rotatable around an axis using an electrical motor controlled on the basis of output of an encoder determining rotation of the emitting/receiving element or an axis of the motor, where the output of the encoder is also fed to another controller which also receives information relating to e.g. a direction of the vessel or a direction from the vessel and toward an antenna.

A first aspect of the invention relates to a vehicle, vessel or airplane comprising A radiation emitting/receiving element mounted on the vehicle/vessel/airplane so as to be rotatable around a predetermined axis in relation to the vehicle/vessel/airplane An electric motor configured to rotate the radiation emitting/receiving element around the predetermined axis, the electric motor comprising a static part and a rotating part comprising a first shaft and being rotatable in relation to the static part, the static part or the rotating part comprising one or more phases, A rotational/positioning encoder configured to output first information relating to a rotation or rotational angle of the first shaft in relation to the static part, A first controller configured to receive the first information from the rotational/positioning encoder and generate, on the basis thereof, a first signal for each phase, A second controller configured to receive the first information from the rotational/positioning encoder as well as to receive second information relating to a position/direction/axis in relation to the vehicle/vessel/airplane and output a second signal based thereon.

In the present context, a vehicle is usually a means of transport on land such as a car, bus, train, lorry, motorcycle or the like. A vessel usually is a means of transport on water such as a lake or an ocean. Vessels may be ships, ferries, tankers, container ships or the like. An airplane usually is a means of transport in the air, such as for military use or civilian use, such as for transporting persons or cargo. Naturally, structures to which the radiation/emitting element is fastened, will also be seen as vehicles, when transported over land by e.g. a truck and as a vessel when transported over the sea by e.g. a ship or on a barge or the like towed by a ship. Structures of this type may be oil rigs, missile/rocket launchers and the like.

In the present context, a radiation emitting/receiving element can be configured to receive and/or emit radiation. The radiation can be visible radiation, infra-red radiation, and/or ultra-violet radiation, but is usually micro-wave radiation, or radio-waves. The radiation emitted or received may carry information to/from the vessel/vehicle/airplane such as for exchanging communication, i.e. emails or telephone discussions, global positioning system (GPS) coordinates, Internet browsing data, streaming video or audio, data, alerts, warnings or the like.

A direction may be defined for a radiation emitting/receiving element.

Usually, a radiation/emitting element is an antenna, which may be based on any technology. Typically the antenna is a directional antenna, such as an antenna using a reflector or an active array of transducers. For directional antennas, the direction is that of the highest sensitivity, output intensity and/or an axis of symmetry thereof.

When the emitting/receiving element is mounted on the vehicle/vessel/airplane it is fixed (detachably or not) thereto, but may be rotated in relation thereto. Preferably, the emitting/receiving element is rotatable around multiple axes to enable the receiving/emitting element to point toward e.g. another antenna, such as a satellite, independently of the rotation or movement of the vehicle/vessel/airplane. This is usual for the antennas mounted on e.g. ships. Thus, multiple motors and multiple axes may be desired, around which the receiving/emitting element may be independently rotated.

The predetermined axis may be selected in any desired manner. Often the emitting/receiving element is rotatable around multiple axes of which one is parallel to a deck of a vessel or a horizontal plane, and another is perpendicular thereto, such as vertical. However, other axes or additional axes may be selected.

In the present context, the electric motor is configured to receive an electrical signal and rotate the first shaft in relation to the static part. Different types of electric motors may be used, such as stepper motors, brushless motors or brushed motors. Usually, the electric motor operates by converting the electric signal into an electromagnetic field, acting on one or more permanent magnets/poles of the motor. Often the motor has a rotating part comprising the first shaft and one or more permanent magnets/poles attached to the first shaft. Then the motor may have a static part comprising one or more phases each comprising a coil for converting a received electric signal into an electromagnetic field. The static part may form a housing wherein the poles/stators are provided and from which the first shaft extends.

Alternatively, the rotating part may comprise a number of phases, usually coils, and the housing a number of magnets.

In the present context the rotational/positioning encoder is configured to determine or quantify a parameter related to rotation of the first shaft. Encoders of this type are well-known in the art. The parameter may be e.g. a direction of rotation, an angle of rotation, or a rotational velocity, e.g. determined as RPM or degrees per second. The encoder may be based on a variety of technologies. Encoders exist which may determine e.g. an angle or an angle deviations of a fraction of a degree. Usually, a parameter of the first shaft or an element attached thereto will vary along a circumferential of peripheral portion thereof, so that rotation may be detected as a variation in the parameter. The variation may be generated by a change in reflection of the surface, such as if a number of reflective surfaces are provided along a periphery, so that a degree of reflected radiation may be used for determining a rotational position of the shaft in relation to a detector. Another variation may be a degree of transmitted radiation through the shaft or the attached element which may be varied by providing through-going holes in the shaft or attached element. Another type of encoder is based on one or more magnets attached to the shaft or attached element where the rotation may be determined by a sensing of the change in magnetic field from the magnet(s) during rotation. Many types of encoder output a relative or incremental signal. Other types of encoder has a unique, e.g. digital, output for each shaft position that provides a true, or absolute, position. This is an advantage in that the actual position is not lost during a power interruption. This type of encoder may have e.g. an absolute track with for example a gray code to provide absolute position data. A resolution of at least 2 times the pole*phase product, detections per revolution is desired, preferably 10 times that in order to obtain a smooth operation.

Determination of the direction of rotation may be performed from the order of sensing of two different events/signals during the rotation of the encoder. The different events/signals may be the sensing of the same parameter by different detection elements (displaced angularly) or the detection of different parameters by different detection elements. For example, the timing order of detection of two angularly spaced holes may be used for determining the direction of rotation as may the detection of the same hole using two angularly spaced detection elements. Naturally, the two different events may be detection of two different parameters.

Usually, the detection element of the encoder is stationary in relation to the housing/static portion of the motor, so that the detection of rotation is relative to the housing/static portion. However, the opposite may be desired; that the detection element is stationary in relation to the rotational portion.

Naturally, the encoder may be provided to determine the rotation of any element rotated by the first shaft (or the static portion), such as of the below-mentioned second shaft rotated together with the emitting/receiving element. Even when a gearing is provided, the rotation of the first shaft/housing may be determined.

In the present context, a controller may be based on any technology, such as a DSP, ASIC, FPGA, processor or the like. The controller may be software programmable or hardwired. The controller may be monolithic or may be formed by a number of elements in communication with each other (wireless or/and via wires).

The first and second controllers may be a single controller or individual controllers. Both controllers operate on the basis of the first information from the encoder.

The first controller may be used for controlling the motor on the basis of the output of the encoder. The output of the encoder may enable the first controller to control the direction and/or speed of rotation of the motor as well as, often desired, the torque provided by the motor.

This controlling may be to have the emitting/receiving element point in a desired direction in relation to the vessel/vehicle/airplane or toward an external element, such as an antenna or a satellite. For that purpose, the first controller may be configured to receive an input, which may be received from the second controller, relating to an overall angle/direction or an angular difference or correction, around the axis, which the emitting/receiving element should be rotated to point in the desired direction. Also or in addition, the controlling may be the deriving of a desired torque and torque direction of the rotation. The controller may then determine how to operate the motor to obtain the desired rotation.

The first controller generates signals for the phases. These signals may be of different types depending on which type of motor is used and how the motor is operated. If the motor is operated as a stepper motor, the signals are squared or a quantified sinusoidal signal (micro stepping). If the motor is operated as a brushless motor, the signals are controlled so the magnetic field vector will be leading or lagging the rotor, producing a continuous torque. The signal may be squared or a continuous for example a sinusoidal or a quantified sinusoidal signal.

These types of motors may be operated in different manners and other types of motors also exist. The skilled person will know how to operate any motor in order to obtain the desired rotation.

The second controller is configured to receive, in addition to the information from the rotational/positioning encoder, second information relating to a position/direction/axis in relation to the vehicle/vessel/airplane and output a second signal based thereon. The second information may be from other sensors, such as accelerometers, rate sensors or signal-strength detectors. This is useful when the vessel/vehicle/airplane moves in relation to the direction/antenna/satellite.

In one example, the second information may relate to a desired direction from the vessel/vehicle/airplane, such as toward a predetermined antenna or satellite. The information from the encoder may be used for determining a difference in a direction of the emitting/receiving element and a direction or axis of the vessel/vehicle/airplane, and the second information may indicate a difference or angle between the desired direction and the direction/axis of the vessel/vehicle/airplane.

In another example, the second information is a position of the vessel/vehicle/airplane in relation to a predetermined coordinate system, such as a GPS position of the vessel/vehicle/airplane. In this situation, information may be derived relating to the attitude of the vessel/vehicle/airplane and a pointing direction toward a predetermined antenna, such as satellite, the position of which is also known.

In yet another example, the second information is a direction of the vessel/vehicle/airplane, such as a direction of a movement thereof, in a predetermined coordinate system, or a direction of a predetermined axis of a vessel/vehicle/airplane, such as a longitudinal axis, in a coordinate system. In this situation, a direction may be determined from the vessel/vehicle/airplane toward a predetermined antenna.

Naturally, combinations of these situations may be desired.

A direction toward e.g. a satellite may be derived from the direction/position of the vehicle/vessel/airplane as well as coordinates of the satellite or an ID thereof and a look-up table from which the coordinates may be derived.

Consequently, the second controller may, from the output of the encoder, determine a direction of the emitting/receiving element in relation to the vessel/vehicle/airplane and may, from the second information, determine a direction from the vessel/vehicle/airplane toward a desired direction or antenna. Thus, the information output from the second controller may relate to the overall angular difference between the emitting/receiving element and the antenna, and may be used to control, such as via the first controller, the direction of the emitting/receiving element.

As mentioned above, different types of motors may be used. Stepper motors (or Hybrid Stepper motors) provide high torque at low RPM. These motors are able to rotate in full steps or micro steps. Brushless motors can provide a controlled torque and thereby a smooth motion but are designed for a higher RPM. In the white paper: QCI-WP003 by QuickSilver Controls (http://www.quicksilvercontrols.com/SP/WP/QCI-WP003_ServoControlOfMicrostepMotor.pdf the operation of a stepper motor, as a brushless motor is described. This has the advantage of high torque at low RPM with a smooth rotation.

Thus, in one embodiment, one of the static part and the rotating part of the electric motor comprises a first number of phases and the other of the rotating part and the static part has a second number of poles, wherein the first number multiplied with the second number is at least 48. Preferably, the pole*phase product (first number multiplied with the second number)) exceeds 60, such as 100, such as 200, such as 300. Preferably, the signals are sinusoidal. Preferably, the motor is operated in a torque mode where the field vector in the motor is controlled to be leading or lagging the rotor. This differs from the usual mode of operating stepper motors.

In general, as the skilled person will know, the rotation provided by the motor, may be transferred to the element to be rotated in a number of manners.

It is irrelevant which of the rotatable part and the static part engages the element to be rotated and which engages the structure in relation to which the element is to be rotated.

In one embodiment, the vehicle/vessel/airplane further comprises a second shaft extending along the predetermined axis, the radiation emitting/receiving element being connected to the second shaft, the electric motor being configured to rotate the second shaft. In this situation, the first shaft (or the static part) may be directly connected to the second shaft or connected to the second shaft via a gear.

In the first situation, the first and second shafts may extend along the predetermined axis and may be a monolithic element. Alternatively, the housing may be fixed directly to the second shaft. An advantage of this is embodiment is that no additional elements are required and that weight is kept at a minimum. However, as no gearing is provided, the rotation usually is desired at low angles but at high precision and high torque. Thus, a brushless motor or a motor operated as such is preferred.

In the second situation, the gear may convert one rotation of the first shaft to more than one or less than one rotation of the second shaft. The gearing preferably is known by the first and usually also the second controller. The gear may be based on any technology, such as toothed gears/wheels, belts or the like. The intermediate gear may facilitate a more versatile positioning of the motor in relation to the second shaft. Thus, the electric motor need not be rotating around the same axis and may be displaced in relation to the second shaft. In this situation, the gearing may make it possible or desirable to use standard brushless motors usually operating at rather high RPMs, even when the rotation of the second shaft may be desired at rather low angles. As mentioned above, the first controller may be configured to, on a basis of the second signal, control the motor to direct the radiation emitting/receiving element to point in or toward the position/direction/axis. In that situation, the second information preferably relates to a predetermined direction in relation to the vehicle/vessel/airplane, the second controller being configured to receive third information relating to a position/direction/axis of the vehicle/vessel/airplane, such as in a predetermined coordinate system, and base the second signal also on the third information.

A second aspect of the invention relates to a method of operating a vehicle/vessel/airplane according to the first aspect, the method comprising the steps of:

I. the electric motor rotating the radiation emitting/receiving element around the predetermined axis, II. the rotational/positioning encoder outputting the first information relating to the rotation or rotational angle of the rotational part in relation to the static part, III. the first controller receiving the first information from the rotational/positioning encoder and generating a first signal for each phase, IV. the second controller receiving the first information from the rotational/positioning encoder as well as the second information relating to a position/direction/axis in relation to the vehicle/vessel/airplane, and outputting a second signal based thereon.

As mentioned above, step I. may be performed in order to maintain a direction of the emitting/receiving element toward a desired direction or target, such as a satellite.

Step II. may be performed by the encoder directly detecting the rotation of the first shaft or by the encoder detecting rotation of an element connected to and/or rotated by the first shaft, such as via a gear.

Step III. may be a step of the first controller generating the signals to provide a desired rotation of the first shaft, such as a desired direction of rotation, rotation velocity and/or torque. The skilled person knows how to control an electrical motor to obtain this.

In one embodiment, one of the static part and the rotating part of the electric motor comprises a first number of phases and the other of the rotating part and the static part has a second number of poles, wherein the first number multiplied with the second number is at least 48. As mentioned above, is result may be even higher, which may facilitate a higher torque at a lower RPM.

Preferably, the motor is operated in a torque mode where the field vector in the motor is controlled to be leading or lagging the rotor. This differs from the usual mode of operating stepper motors. In one embodiment, the vehicle/vessel/airplane further comprises a second shaft extending along the predetermined axis, the radiation emitting/receiving element being connected to the second shaft, wherein step I. comprises the electric motor rotating the second shaft, such as via the first shaft. In one situation, as is described above, the electric motor then directly rotating the second shaft, and in another situation, the electric motor rotates the second shaft via a gear. As mentioned above, the motor and/or encoder can be placed on either the static part or the rotating part and any of these parts may be the part of the motor engaging the second shaft.

In one embodiment, step I. comprises the first controller, on a basis of the second signal, directing the radiation emitting/receiving element to point in or toward the position/direction/axis. Then, the second information may relate to a predetermined direction in relation to the vehicle/vessel/airplane, and step IV. may comprise the first controller receiving also third information relating to a position/direction/axis of the vehicle/vessel/airplane and basing the second signal also on the third information.

BRIEF DESCRIPTION OF THE DRAWINGS

In the following, preferred embodiments of the invention are described with reference to the drawing, wherein.

DESCRIPTION OF PREFERRED EMBODIMENTS

Figure 1:
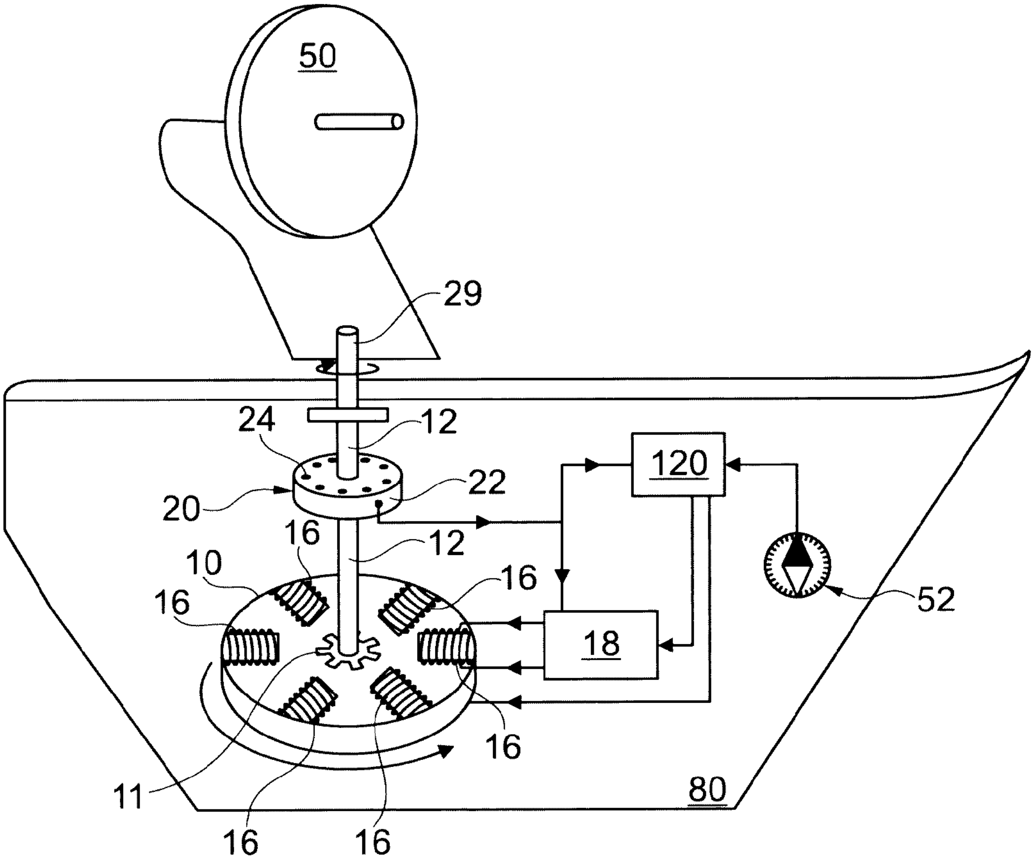
FIG. 1 illustrates a functional block diagram of a motor control system, together with an encoder, navigation block, and control board.

In FIG. 1, a vessel 80 is illustrated having a radiation emitting/receiving element, such as an antenna, 50 mounted on the vessel 80. In other embodiments, the vessel can be replaced by any non-stationary system such as a vehicle or an airplane. The radiation emitting/receiving element 50 is mounted on the vehicle/vessel/airplane so as to be rotatable around a predetermined axis in relation to the vehicle/vessel/ airplane. Often, antennas are rotatable around two or more axes. Each axis may be treated the same or differently, and below the rotation around only a single axis is described. The skilled person will know how to increase the number of axes/dimensions.

An electric motor 10 facilitates rotation of the radiation emitting/receiving element 50 around the predetermined axis. The electric motor 10 comprises a static part and a rotating part 12. Usually, the static part has a housing 13 (see FIG. 2) and the rotating part a shaft. Usually, the motor has one or more phases 16 and one or more magnets/poles 11. In the present embodiment, 6 phases 16 are illustrated fixed to the housing, where the magnets are fixed to the shaft. In an alternative, the phases may be attached to the shaft (brushed motor) and the magnets to the housing.

Naturally, any number of phases In the present embodiment only 6 phases are illustrated, but any number thereof may be used. The more phases, the higher the torque is possible at a lower RPM. Usually, the desired quantification is the multiplum of the number of phases and the number of poles. Phases*poles preferably exceeds 48. The presently preferred type of motor is one typically used as a stepper motor. Such motors have a much larger number of stators/phases than the motors typically used as brushless motors, and they usually provide a better torque/weight and torque/power ratio and a lower operating RPM A rotational/positioning encoder 20 is fixed to the first shaft 12 and outputs an output relating or corresponding to a rotation of the first shaft 12. This output may relate to an angle of rotation, an angular velocity of the rotation, a direction of rotation or the like in relation to the static part. Rotational/positioning encoders may be based on a number of technologies. In one embodiment, the rotational/positioning encoder has a disc 22 having a plurality of openings or holes 24 through which radiation may pass from a light emitter to a light receiver (not shown in the drawing) positioned on opposite sides of the disc. In another embodiment, the plurality of openings can be replaced with reflective elements, where the emitter/receiver may be on the same side of the disc. Multiple openings may be positioned at different radii of the disc and may be angularly displaced so that a direction of rotation may be inferred from an order of detection of radiation of two detectors detecting openings at different angular positions. Other types of encoders may be based on inductive elements or capacitive elements. Encoders can in general determine an incremental or an absolute rotation or angle. The rotational/positioning encoder 20 provides, to the first controller 18, information relating to a rotation or rotational angle of the first shaft 12, such as over time and/or in relation to the static part. The first controller 18 uses this information to generate a signal to drive each phase 16 of the motor 16.

Operating the electric motor 10 as a stepper motor comprises feeding square-wave or micro stepping signals to the phases 16 in a manner so that the first shaft 12 rotates to a next position, where the magnetic fields of the phases will keep the shaft 12 stationary until the signals fed to the phases 16 change. This, however, may give a jerky movement.

Preferably, however, the motor is operated as a brushless motor where the signal from the first controller 18 fed to each individual phase 16 producing a torque with the magnetic field vector leading or lagging the rotor, producing a controllable torque not depending on the rotation angle of the motor , so that the rotation of the first shaft 12 is more smooth than when using stepper motors. In this manner, and depending on the number of poles*phases, a high torque may be provided together with a low number of revolutions per minute as well as a smooth control.

The operation of the motor 10, especially when operated with the continuous signal shapes used in torque mode, preferably is performed using the angle information derived from the encoder 20. When operating a motor as a brushless motor, the angular position between the shaft/magnet in relation to the phase 16 is desired in order to feed the correct signals to the poles so that the desired torque is produced. The same type of operation may, however, be obtained using also a brushed motor.

Figure 2:
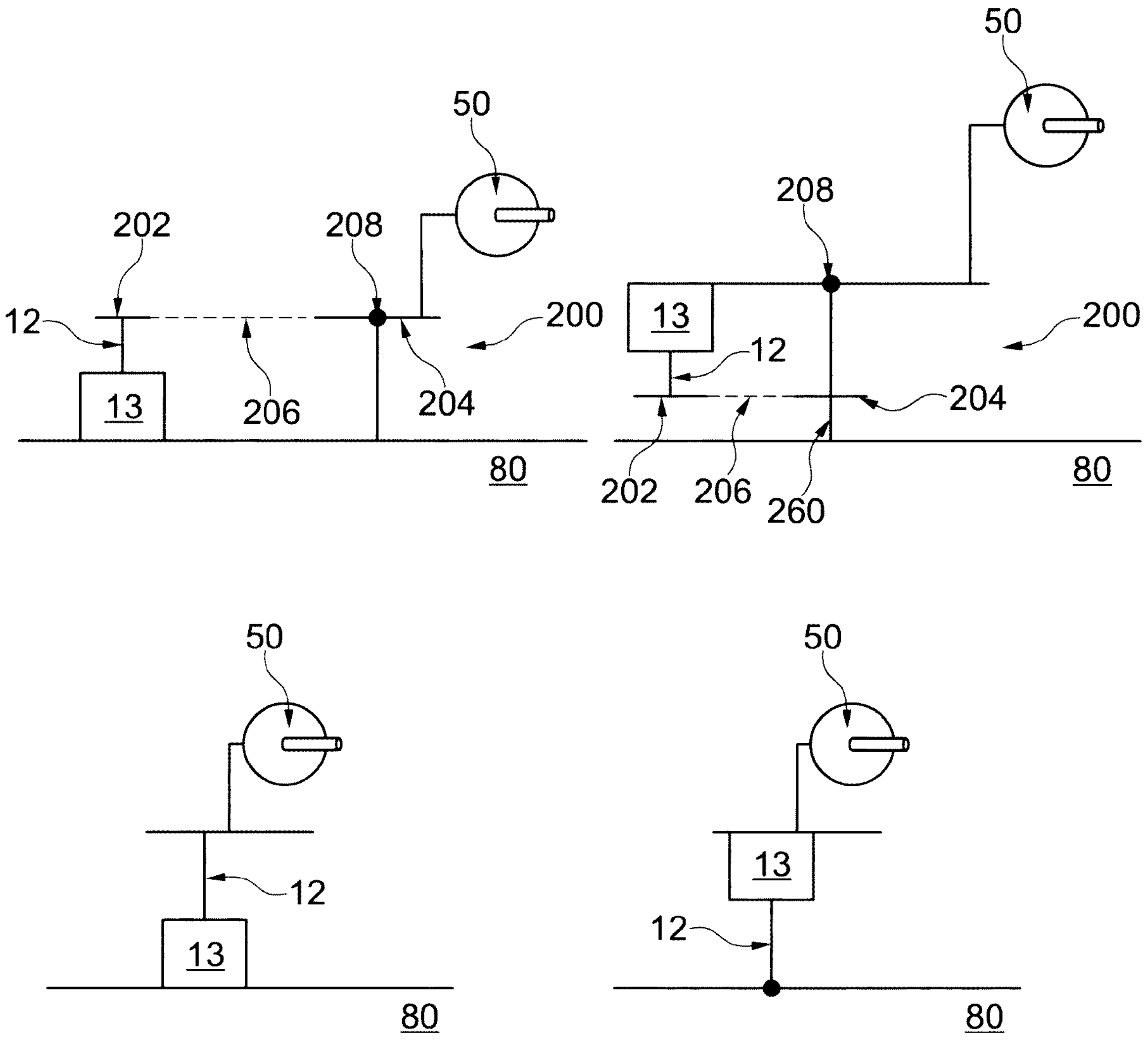
FIG. 2 illustrates different manners of connecting an electric motor to a radiation emitting/receiving element.

In FIG. 2 different connections between the motor 10 and the radiation emitting/receiving element 50 are illustrated.

In the left illustrations, the static part is fixed to the structure/vessel 80 and the antenna 50 is rotated by the shaft 12, In the right illustrations, the opposite is the case: the static part 13 is fixed to the antenna 50 and the rotation of the shaft 12 brings about the rotation.

In the lower illustrations, the motor housing 13 is directly connected to the antenna 50 and the structure 80 whereas in the upper illustrations, the rotation takes place via a gear 200. In the present embodiments, the gear 200 is provided with two wheels 202 and 204 driving a belt 206 and where the antenna 50 is rotated around a bearing 208 via which it is attached to the structure 80. In the upper illustrations, the antenna 50 is rotated around the shaft 210 which may or may not be parallel to the shaft 12. In the lower illustrations, the antenna 50 is rotated around the shaft 12.

In a preferred embodiment, the motor can rotate a payload of up to 100 kg, such as up to 1000 kg at a maximum speed of 30°/s, such as up to 360°/s.

In operation, the first controller 18 may control the direction of the emitting/receiving element 50 for one of a number of reasons. In one situation, the direction of the emitting/receiving element 50 may be desired scanned along a desired path. In another situation, the direction of the emitting/receiving element 50 may be desired maintained toward a desired direction or target (such as an antenna or e.g. a satellite) irrespective of the movement of the vessel. During movement of the vessel, it may rotate, roll, pitch and yaw, where the first controller 18 may adapt the signals fed to the motor to keep the direction of the emitting/receiving element as desired. This controlling may be made on the basis of a number of types of information, such as accelerometers, signal strength gauges or the like, as is known in the art.

When the antenna or radiation emitting/receiving element 50 is desired directed to e.g. a predetermined object, such as another antenna, which may be provided on e.g. a satellite, the position of the vessel is desired known in relation to e.g. a fixed coordinate system (such as the GPS coordinates) as well as the direction or heading 52 of the vessel, so that the relative angle between the vessel and emitting/receiving element 50 may be adapted accordingly.

This relative angle may be derived from the output of the encoder 20, as well as output of other encoders if the emitting/receiving element 50 may be rotated around additional axes. Thus, a second controller 120 may be provided which also receives the output of the encoder 20 and into which more information is fed, such as the position/heading of the vessel, the position/ID of the antenna/satellite or the like, for the second controller to be able to e.g.

output information to the motor 10 or the first controller 18 information relating to a desired relative angle or direction of the emitting/receiving element 50 in relation to the vessel, or a desired angle around the predetermined axis which the emitting/receiving element should be rotated in order to point toward the antenna/satellite desired.

The invention claimed is:

1. A vehicle, vessel or airplane, comprising:

a radiation emitting/receiving element mounted on the vehicle, vessel, or airplane so as to be rotatable around a predetermined axis in relation to the vehicle, vessel, or airplane, an electric motor configured to rotate the radiation emitting/receiving element around the predetermined axis, the electric motor is a stepper motor comprising a static part and a rotating part comprising a first shaft and being rotatable in relation to the static part, an encoder configured to output first information relating to a rotation or rotational angle of the first shaft in relation to the static part, a first controller configured to generate a first signal to control the electric motor, and a second controller configured to receive both the first information from the encoder and second information relating to a position, direction, or axis in relation to the vehicle, vessel, or airplane, determine, based on the first information and the second information, a difference between a direction in which the radiation emitting/receiving element is presently directed and a direction or axis of the vehicle, vessel, or airplane, and a direction from the vehicle, vessel, or airplane toward the position, direction, or axis, and generate, based on the determined difference and direction from the vehicle, vessel, or airplane toward the position, direction, or axis, a second signal relating to an overall angle/direction or an angular difference or correction, around the predetermined axis, to rotate the radiation emitting/receiving element to point in or toward the position, direction, or axis, wherein the first controller is configured to receive both the first information from the encoder and the second signal from the second controller, and generate the first signal based on both the first information from the encoder and the second signal from the second controller to operate the stepper motor in a torque mode to rotate the radiation emitting/receiving element around the predetermined axis to point in or toward the position, direction, or axis, wherein the stepper motor operates in the torque mode at a desired torque regardless of speed and in which a field vector in the stepper motor is controlled to be leading or lagging a rotor of the stepper motor, such that the stepper motor operating in the torque mode causes the radiation emitting/receiving element to rotate in a continuous movement at the desired torque regardless of rotational velocity of rotation of the radiation emitting/receiving element.

2. The vehicle, vessel, or airplane according to claim 1, further comprising a second shaft extending along the predetermined axis, the radiation emitting/receiving element being connected to the second shaft, the electric motor being configured to rotate the second shaft.

3. The vehicle, vessel, or airplane according to claim 2, where one of the static part and the rotating part directly connected to the second shaft.

4. The vehicle, vessel, or airplane according to claim 2, where one of the static part and the rotating part is connected to the second shaft via a gear.

5. The vehicle, vessel, or airplane according to claim 1, wherein the second controller is configured to receive third information relating to a position, direction, or axis of the vehicle, vessel, or airplane, and generate the second signal based on the first information, the second information, and the third information.

6. The vehicle, vessel, or airplane according to claim 1, wherein the first controller is configured to operate the electric motor in the torque mode wherein the electric motor operates with the desired torque independently of both rotational speed and rotational position and in which the field vector in the electric motor is controlled to be leading or lagging the rotor of the electric motor.

7. The vehicle, vessel, or airplane according to claim 1, wherein the static part or the rotating part comprises one or more phases, one of the static part and the rotating part of the electric motor comprises a first number of phases and another of the rotating part and the static part has a second number of poles, and the first number multiplied with the second number is a pole*phase product that is at least 48.

8. The vehicle, vessel, or airplane according to claim 7, wherein the encoder has a resolution of at least 10 times the pole*phase product.

9. The vehicle, vessel, or airplane according to claim 1, wherein the first controller is configured to generate the first signal based on both the first information from the encoder and the second signal from the second controller to operate the stepper motor in the torque mode to rotate the radiation emitting/receiving element around the predetermined axis to track the position, direction, or axis as the position, direction, or axis moves in relation to the radiation emitting/receiving element, such that the stepper motor operating in the torque mode causes the radiation emitting/receiving element to track the position, direction, or axis via continuous movement at the desired torque regardless of rotational velocity of rotation of the radiation emitting/receiving element.

10. A method of operating a vehicle, vessel or airplane including a radiation emitting/receiving element and an electric motor, the radiation emitting/receiving element mounted on the vehicle, vessel, or airplane so as to be rotatable around a predetermined axis in relation to the vehicle, vessel, or airplane, the electric motor configured to rotate the radiation emitting/receiving element around the predetermined axis, the electric motor is a stepper motor comprising a static part and a rotating part comprising a first shaft and being rotatable in relation to the static part, the method comprising the steps of:

I. causing an encoder to output first information relating to a rotation or rotational angle of the first shaft in relation to the static part, II. causing a first controller to receive the first information from the encoder, III. causing a second controller to receive both the first information from the encoder as well as second information relating to a position, direction, or axis in relation to vehicle, vessel, or airplane, determine, based on the first information and the second information, a difference between a direction in which the radiation emitting/receiving element is presently directed and a direction or axis of the vehicle, vessel, or airplane, and a direction from the vehicle, vessel, or airplane toward the position, direction, or axis, and generate, based on the determined difference and direction from the vehicle, vessel, or airplane toward the position, direction, or axis, a second signal relating to an overall angle/direction or an angular difference or correction, around the predetermined axis, to rotate the radiation emitting/receiving element to point in or toward the position, direction, or axis, and IV. causing the first controller to generate a first signal based on both the first information from the encoder and the second signal from the second controller to receive both the first information from the encoder and the second signal from the second controller, and generate the first signal based on both the first information from the encoder and the second signal from the second controller to operate the stepper motor in a torque mode to rotate the radiation emitting/receiving element around the predetermined axis to point in or toward the position, direction, or axis, wherein the stepper motor operates in the torque mode at a desired torque regardless of speed and in which a field vector in the stepper motor is controlled to be leading or lagging a rotor of the stepper motor, such that the stepper motor operating in the torque mode causes the radiation emitting/receiving element to rotate in a continuous movement at the desired torque regardless of rotational velocity of rotation of the radiation emitting/receiving element.

11. The method according to claim 10, wherein the first controller generates the first signal based on both the first information from the encoder and the second signal from the second controller to operate the stepper motor in the torque mode to rotate the radiation emitting/receiving element around the predetermined axis to track the position, direction, or axis as the position, direction, or axis moves in relation to the radiation emitting/receiving element, such that the stepper motor operating in the torque mode causes the radiation emitting/receiving element to track the position, direction, or axis via continuous movement at the desired torque regardless of rotational velocity of rotation of the radiation emitting/receiving element.

12. The method according to claim 10, wherein the vehicle, vessel, or airplane further comprises a second shaft extending along the predetermined axis, the radiation emitting/receiving element being connected to the second shaft, and step IV. comprises the electric motor rotating the second shaft.

13. The method according to claim 12, wherein step IV, comprises the electric motor directly rotating the second shaft.

14. The method according to claim 13, wherein step IV, comprises the electric motor rotating the second shaft via a gear.

15. The method according to claim 10, wherein step III. comprises causing the second controller to receive third information relating to a position, direction, or axis of the vehicle, vessel, or airplane, and generate the second signal based on the first information, the second information, and the third information the third information.

* * * * *